(12) United States Patent
Guemmer

(10) Patent No.: US 8,262,340 B2
(45) Date of Patent: Sep. 11, 2012

(54) TURBOMACHINE EXERTING DYNAMIC INFLUENCE ON THE FLOW

(75) Inventor: Volker Guemmer, Mahlow (DE)

(73) Assignee: Rolls-Royce Deutschland Ltd Co KG (DE)

( * ) Notice: Subject to any disclaimer, the term of this patent is extended or adjusted under 35 U.S.C. 154(b) by 236 days.

(21) Appl. No.: 11/280,817

(22) Filed: Nov. 17, 2005

(65) Prior Publication Data

US 2006/0153673 A1     Jul. 13, 2006

(30) Foreign Application Priority Data

Nov. 17, 2004   (DE) .......................... 10 2004 055 439

(51) Int. Cl.
    *F01D 1/12*     (2006.01)
    *F01D 1/04*     (2006.01)
(52) U.S. Cl. ....... 415/57.1; 415/58.5; 415/144; 415/914
(58) Field of Classification Search ................. 415/54.1, 415/57.1–57.4, 58.5, 115, 116, 144, 145, 415/914, 173.1; 416/96 R, 97 R
See application file for complete search history.

(56) References Cited

U.S. PATENT DOCUMENTS

| | | | |
|---|---|---|---|
| 2,933,238 A * | 4/1960 | Stalker .......................... 415/58.1 |
| 3,066,912 A | 12/1962 | Scheper | |
| 3,572,960 A | 3/1971 | McBride | |
| 3,694,102 A | 9/1972 | Conrad | |
| 3,846,038 A | 11/1974 | Carriere | |
| 3,849,023 A | 11/1974 | Klompas | |
| 3,993,414 A | 11/1976 | Meauze | |
| 4,155,680 A | 5/1979 | Linko | |
| 4,415,310 A | 11/1983 | Bouiller | |
| 4,466,772 A | 8/1984 | Okapuu et al. | |
| 4,479,755 A * | 10/1984 | Skoe ................................. 415/1 |
| 4,642,027 A | 2/1987 | Popp | |
| 4,659,282 A | 4/1987 | Popp | |
| 5,059,093 A | 10/1991 | Khalid | |
| 5,203,162 A | 4/1993 | Burge | |
| 5,230,605 A | 7/1993 | Yamaguchi | |
| 5,308,225 A | 5/1994 | Koff et al. | |
| 5,327,716 A | 7/1994 | Giffin | |

(Continued)

FOREIGN PATENT DOCUMENTS

DE     889 506     9/1953

(Continued)

OTHER PUBLICATIONS

European Search Report dated Nov. 22, 2006 from counterpart application.

(Continued)

*Primary Examiner* — Edward Look
*Assistant Examiner* — Sean J Younger
(74) *Attorney, Agent, or Firm* — Timothy J. Klima; Shuttleworth & Ingersoll, PLC

(57) ABSTRACT

A turbomachine includes at least one rotor 1 featuring a hub and one stator 2, with a casing 5 confining the flow through the rotor 1 and the stator 2 to the outside. It also includes running-gap adjacent hub and casing surfaces LNGO, with openings being provided along the circumference on at least one running-gap adjacent hub and casing surface LNGO which form at least one dynamically operating supply point DAV which is connected via a least one line 6 to at least one opening on a blade-passage confining surface SKO.

18 Claims, 17 Drawing Sheets

U.S. PATENT DOCUMENTS

| | | | |
|---|---|---|---|
| 5,431,533 A * | 7/1995 | Hobbs | 415/58.7 |
| 5,474,417 A | 12/1995 | Privett et al. | |
| 5,480,284 A | 1/1996 | Wadia | |
| 5,707,206 A | 1/1998 | Goto et al. | |
| 5,762,034 A | 6/1998 | Foss | |
| 5,762,470 A | 6/1998 | Gelmedov et al. | |
| 5,876,182 A | 3/1999 | Schulte | |
| 5,950,308 A | 9/1999 | Koff et al. | |
| 6,109,868 A | 8/2000 | Burlman | |
| 6,234,747 B1 | 5/2001 | Mielke et al. | |
| 6,290,458 B1 | 9/2001 | Irie et al. | |
| 6,302,640 B1 | 10/2001 | McKelvey | |
| 6,574,965 B1 * | 6/2003 | Feulner | 60/785 |
| 6,585,479 B2 * | 7/2003 | Torrance | 415/58.5 |
| 6,619,909 B2 | 9/2003 | Barnett et al. | |
| 6,663,346 B2 | 12/2003 | Munsell | |
| 6,742,983 B2 | 6/2004 | Schmuecker | |
| 6,832,890 B2 | 12/2004 | Booth | |
| 7,077,623 B2 | 7/2006 | Guemmer | |
| 7,097,414 B2 | 8/2006 | Strangeland | |
| 7,186,072 B2 | 3/2007 | Seitz | |
| 7,387,487 B2 | 6/2008 | Guemmer | |
| 7,575,412 B2 | 8/2009 | Seitz | |
| 7,594,793 B2 | 9/2009 | Guemmer | |
| 7,645,121 B2 | 1/2010 | Tudor | |
| 7,811,049 B2 | 10/2010 | Xu | |
| 7,861,823 B2 | 1/2011 | Prasad et al. | |
| 2003/0026695 A1 | 2/2003 | Schmuecker | |
| 2004/0081552 A1 | 4/2004 | Guemmer | |
| 2005/0019152 A1 | 1/2005 | Seitz | |
| 2005/0058541 A1 | 3/2005 | LeBiez et al. | |
| 2005/0226717 A1 | 10/2005 | Xu | |
| 2005/0238483 A1 | 10/2005 | Guemmer | |
| 2006/0051199 A1 | 3/2006 | Guemmer | |
| 2006/0104805 A1 | 5/2006 | Gummer | |
| 2006/0153673 A1 | 7/2006 | Guemmer | |
| 2008/0044273 A1 | 2/2008 | Khalid | |
| 2008/0199306 A1 | 8/2008 | Lebret | |
| 2009/0160135 A1 | 6/2009 | Turini et al. | |
| 2009/0290974 A1 | 11/2009 | Bayere et al. | |

FOREIGN PATENT DOCUMENTS

| | | |
|---|---|---|
| DE | 1 042 828 | 11/1958 |
| DE | 1 428 188 | 11/1968 |
| DE | 3407945 | 9/1985 |
| DE | 19 63 22 07 | 2/1998 |
| DE | 10135003 C1 | 10/2002 |
| DE | 10233032 A1 | 1/2004 |
| DE | 10330084 A1 | 3/2004 |
| DE | 102004043036 | 3/2006 |
| EP | 0497574 B1 | 9/1995 |
| EP | 0718469 B1 | 12/1995 |
| EP | 0754864 | 1/1997 |
| EP | 0719908 B1 | 3/2000 |
| EP | 1 013 937 | 6/2000 |
| EP | 1 286 022 | 2/2003 |
| EP | 1382855 | 1/2004 |
| GB | 619 722 | 3/1949 |
| GB | 987625 | 3/1965 |
| GB | 2408546 | 6/2005 |
| WO | 95/10692 | 4/1995 |

OTHER PUBLICATIONS

Guemmer—U.S. Appl. No. 12/222,532, filed Aug. 11, 2008.
Johann—U.S. Appl. No. 12/379,788, filed Feb. 27, 2009.
Guemmer—U.S. Appl. No. 12/498,050, filed Jul. 6, 2009.
Guemmer—U.S. Appl. No. 12,534,388, filed Aug. 3, 2009.
German Search report dated Oct. 14, 2011 from related application [542].
Yang, Zhou, "Boundary Layer Separation Control on a Highly-Loaded, Low-Solidity Compressor Cascade" Journal of Thermal Science 19.2 (2010): 97-104.
Strazisar, A.J., Bright, M.B., Thorp, S., Culley: D,E., Seder, K.L., "Compressor Stall Control Through Endwall Recirculation", ASME GT2004-54295, proceedings of the ASME Turbo Expo 2004, Jun. 14-17, 2005, Vienna, Austria.
Gao, P., Zhang, Y., Zhang, S., "Numerical Investigation of the Different Casing Treatment in a Centrifugal Compressor", Proceeding APWCS '10 Proceedings of the 2010 Asia-Pacific Conference on Wearable Computing Systems.
Moore, R., Effect of Casing Treatment on Overall and Blade-Element Performance of a Compressor Rotor, NASA TN D-6538, Nov. 1971.
Jan H., Hu, W., "Numerical Investigation of Inlet Distortion on an Axial Flow Compressor Rotor with Circumferential Groove Casing Treatment", Chinese Journal of Aeronautics, 21 (2008) 496-505.
Friedrichs, Jens, Sven Baumgarten, Gunter Kosyna and Udo Stark, "Effect of Stator Design on Stator Boundary Layer Flow in a Highly Loaded Single-Stage Axial Flow Low-Speed Compressor", Journal of Turbomachinery 123.3 (2001): 483.
German Search Report dated Jun. 8, 2011 from a related application [568].
German Search Report Dated Jul. 1, 2011 from related patent application [596].

* cited by examiner

Fig.5
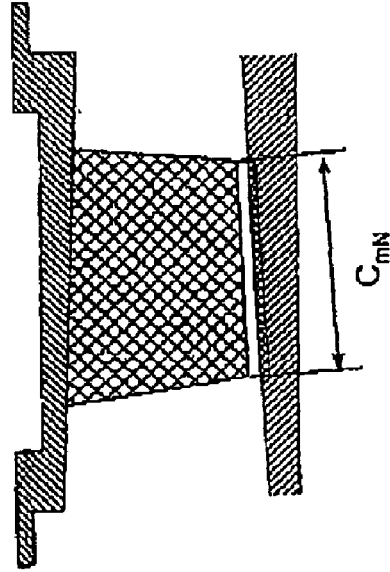
Blade row with platform on casing
and radial running gap on hub
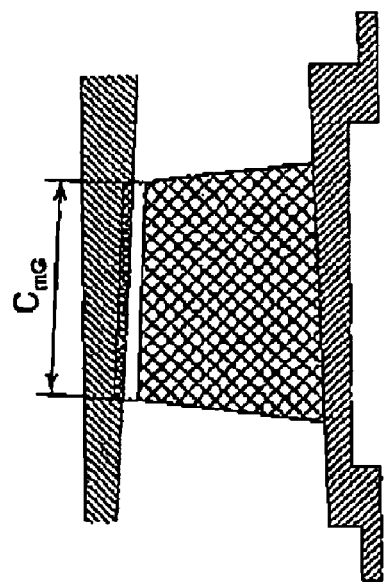
Blade row with platform on hub
and radial running gap on casing
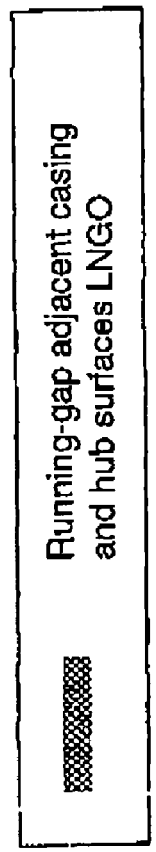
Running-gap adjacent casing
and hub surfaces LNGO

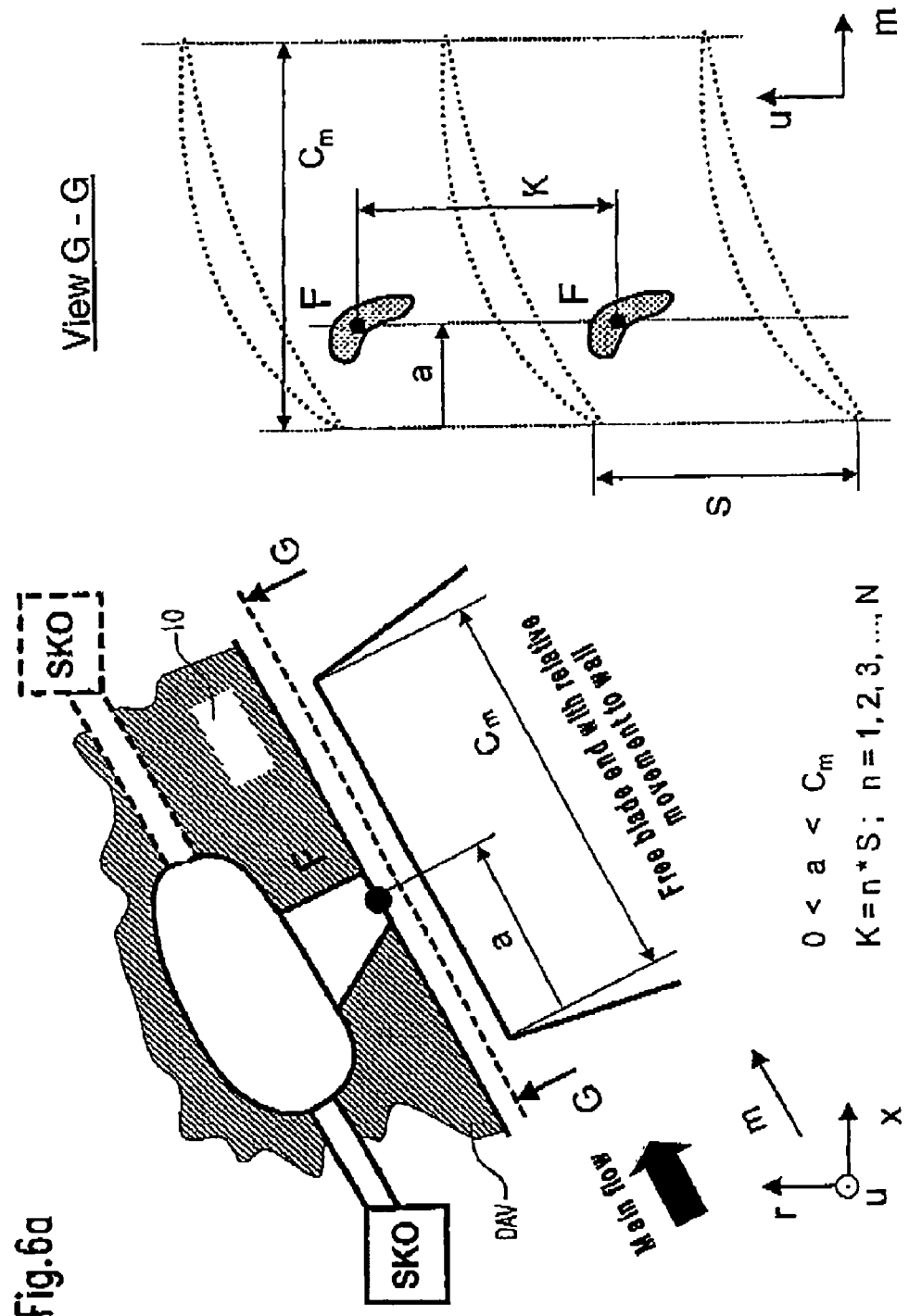

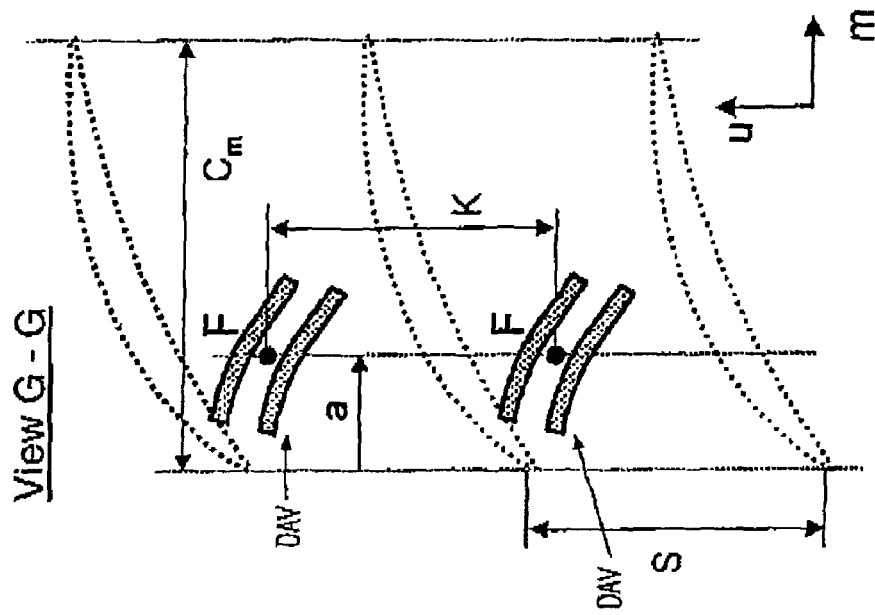
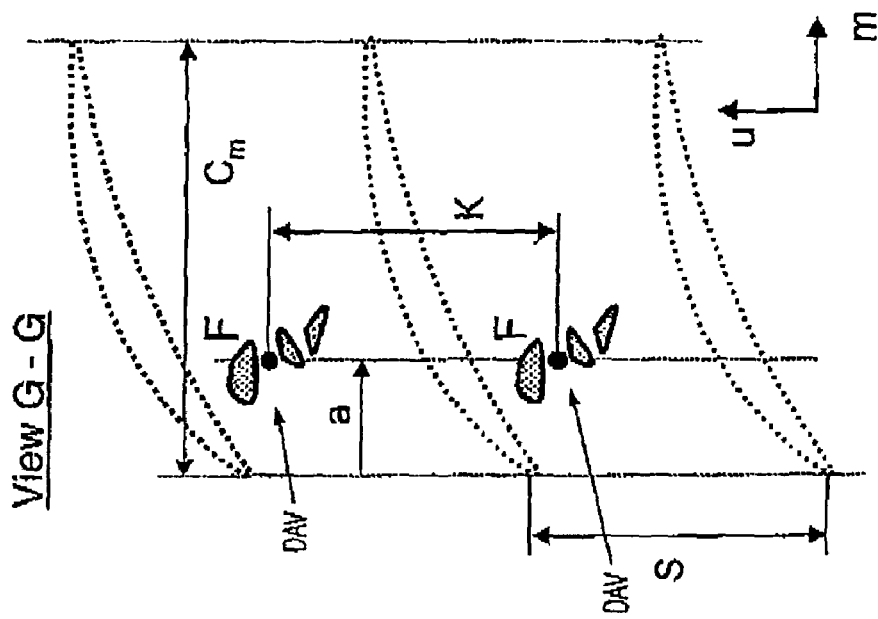

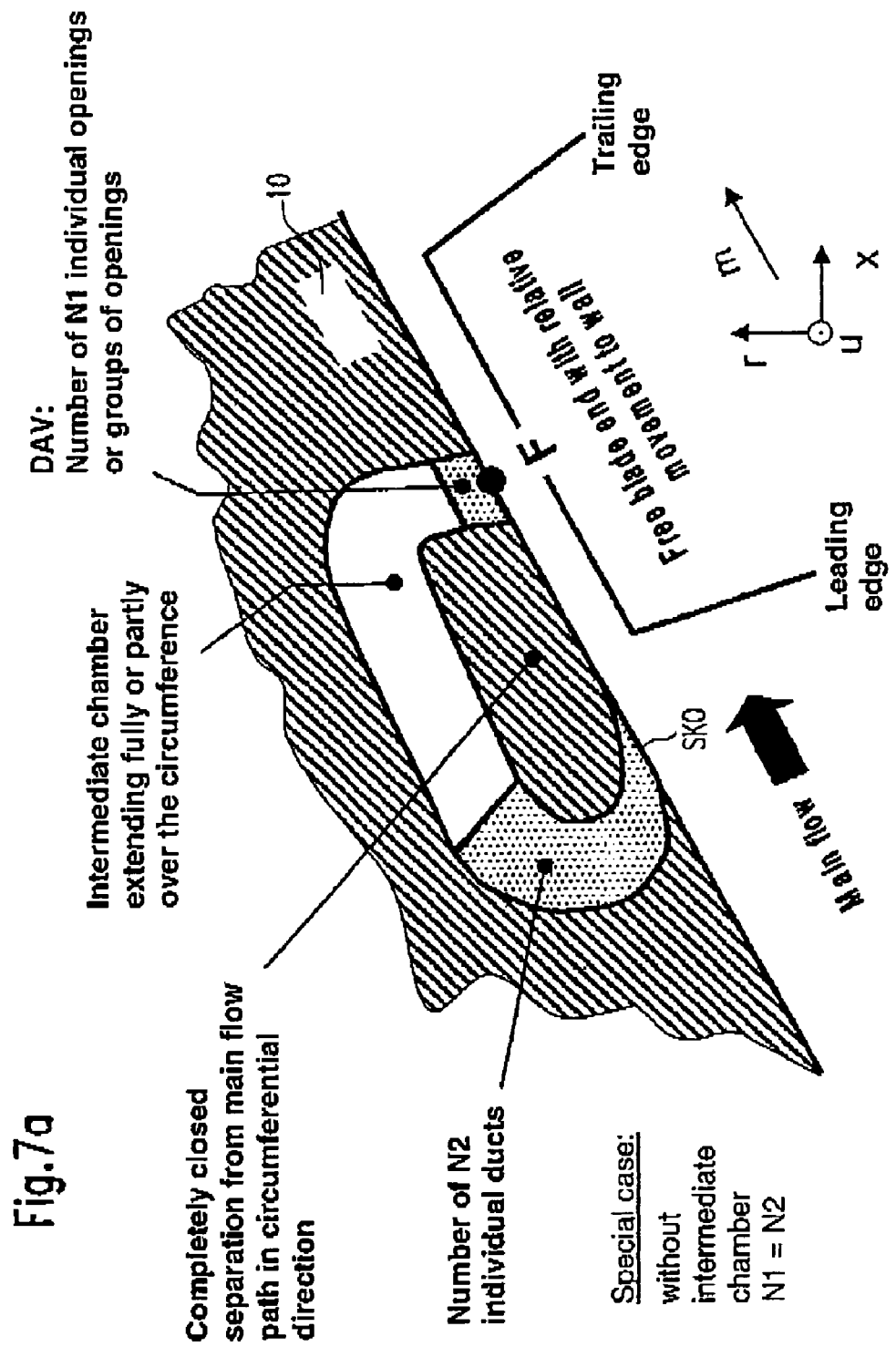

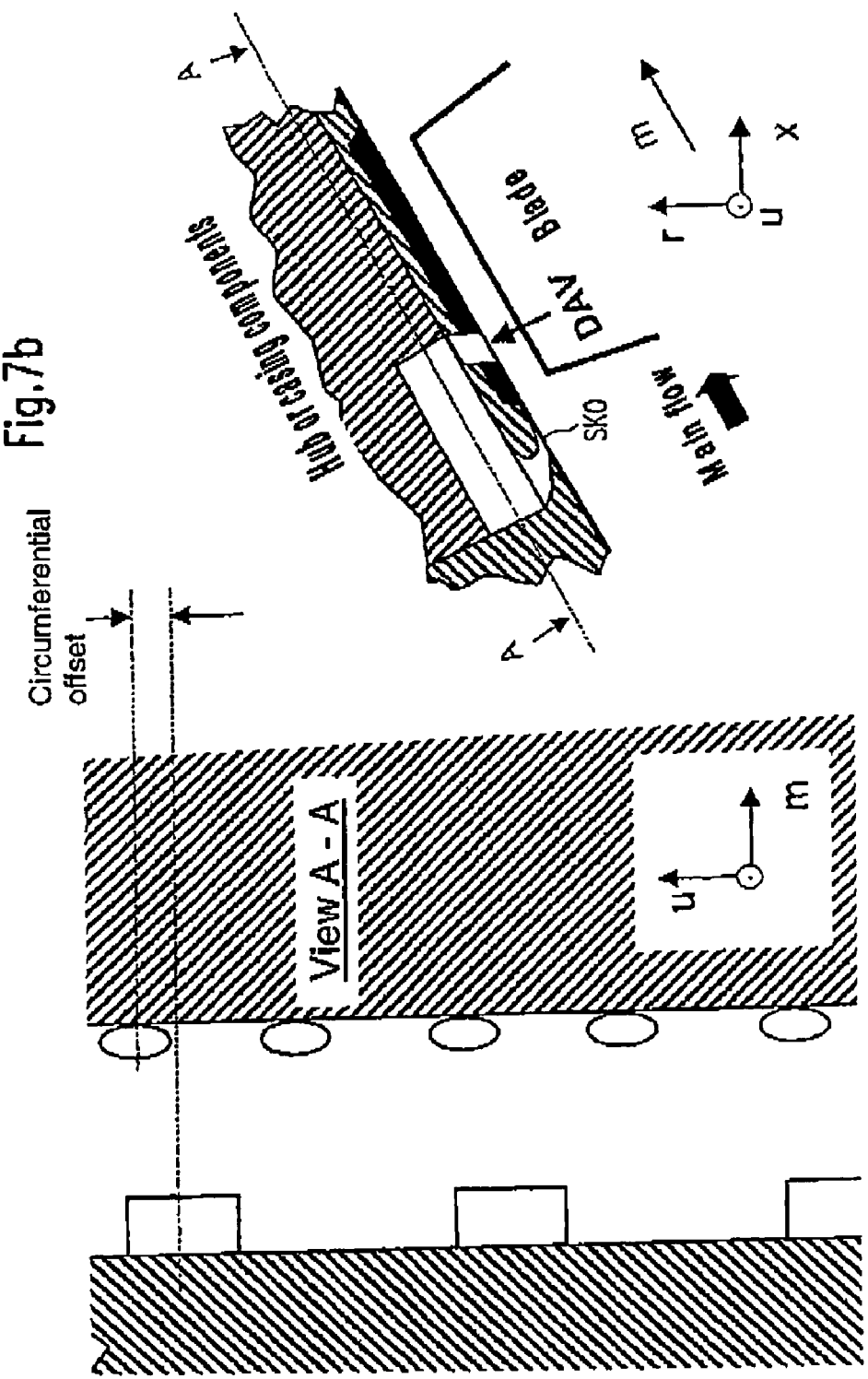

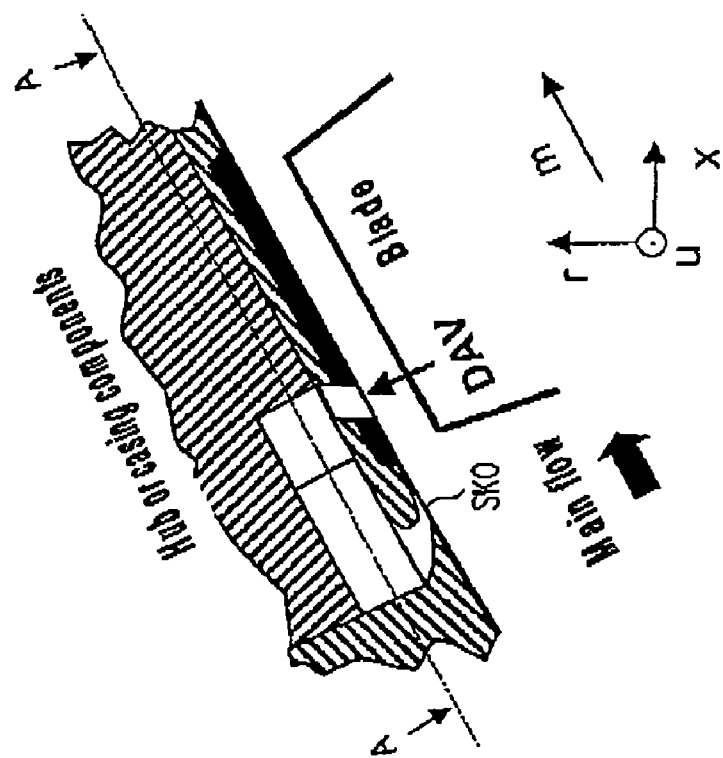
Fig.7c
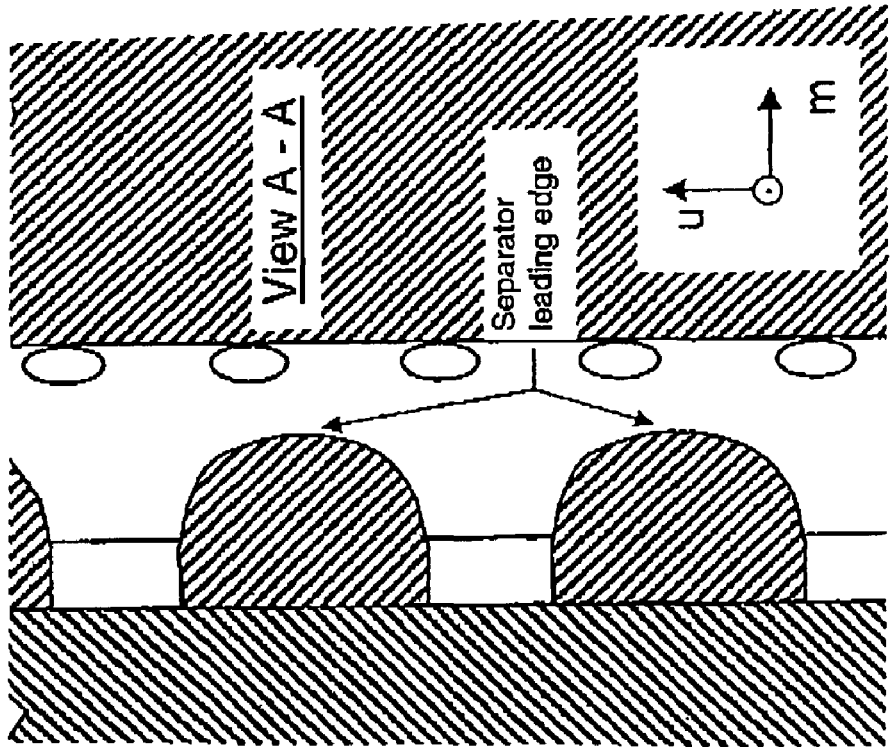
View A-A

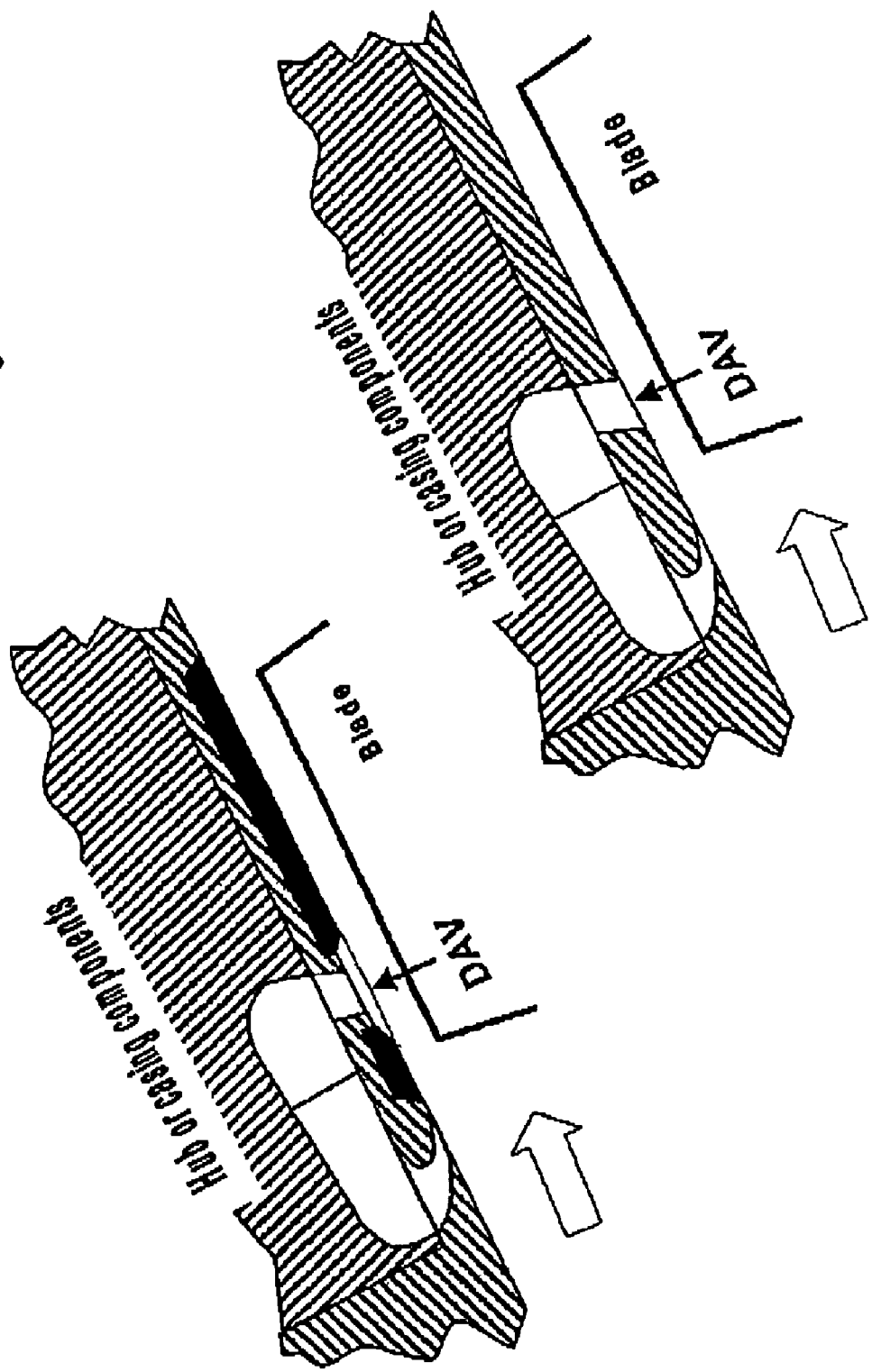

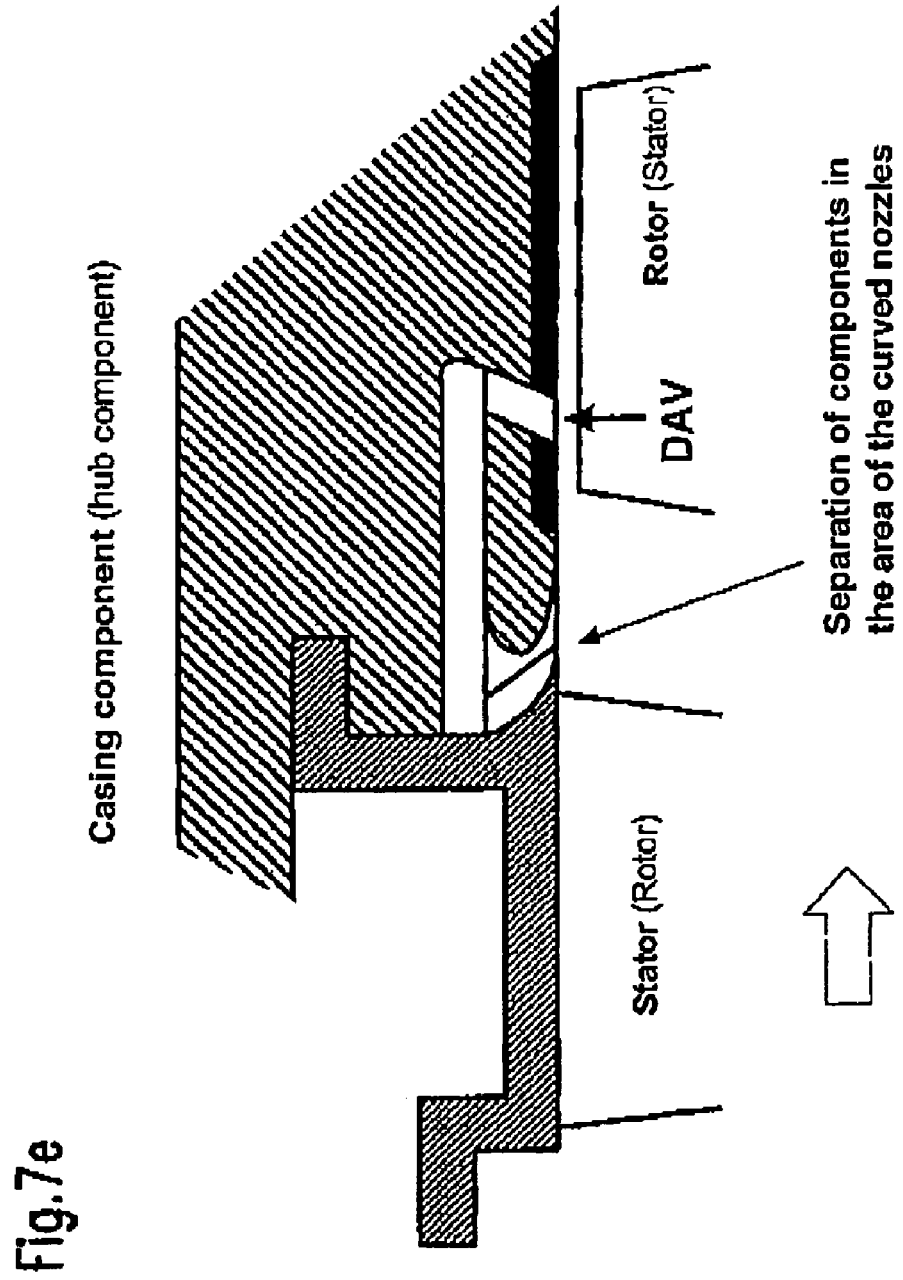

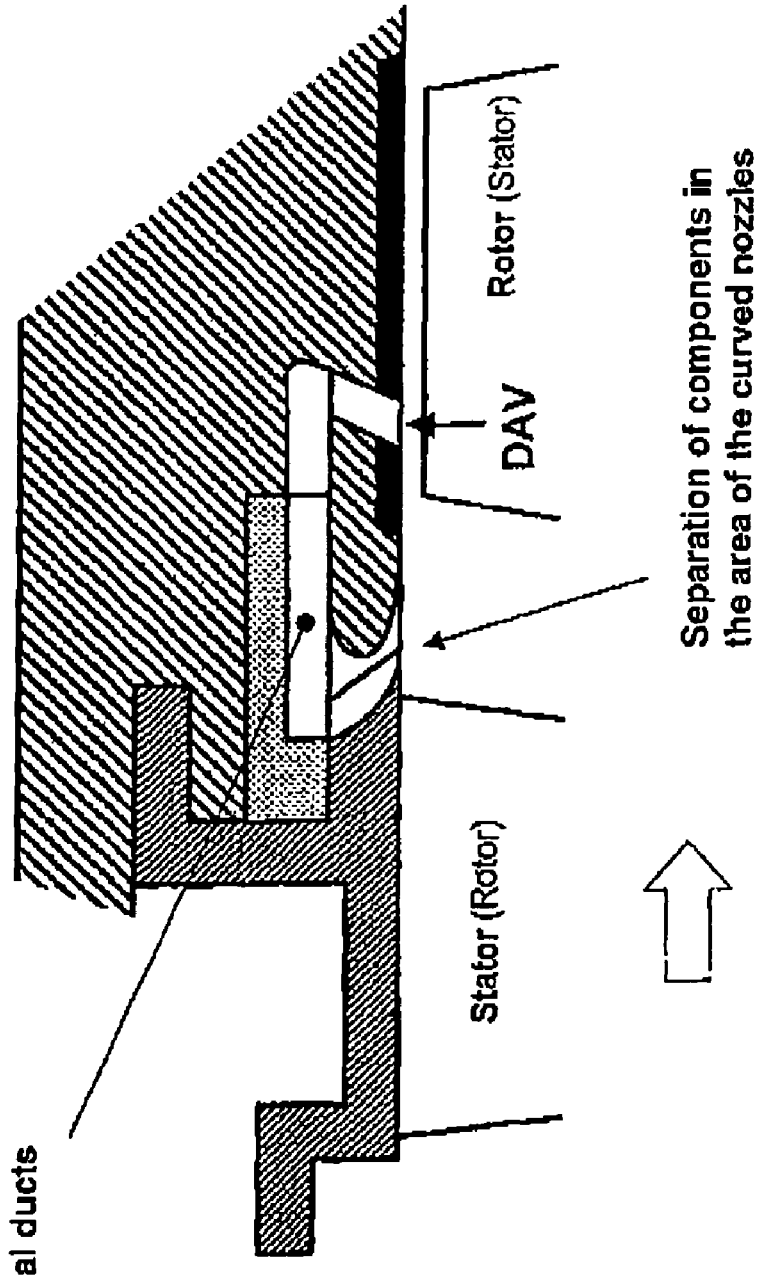

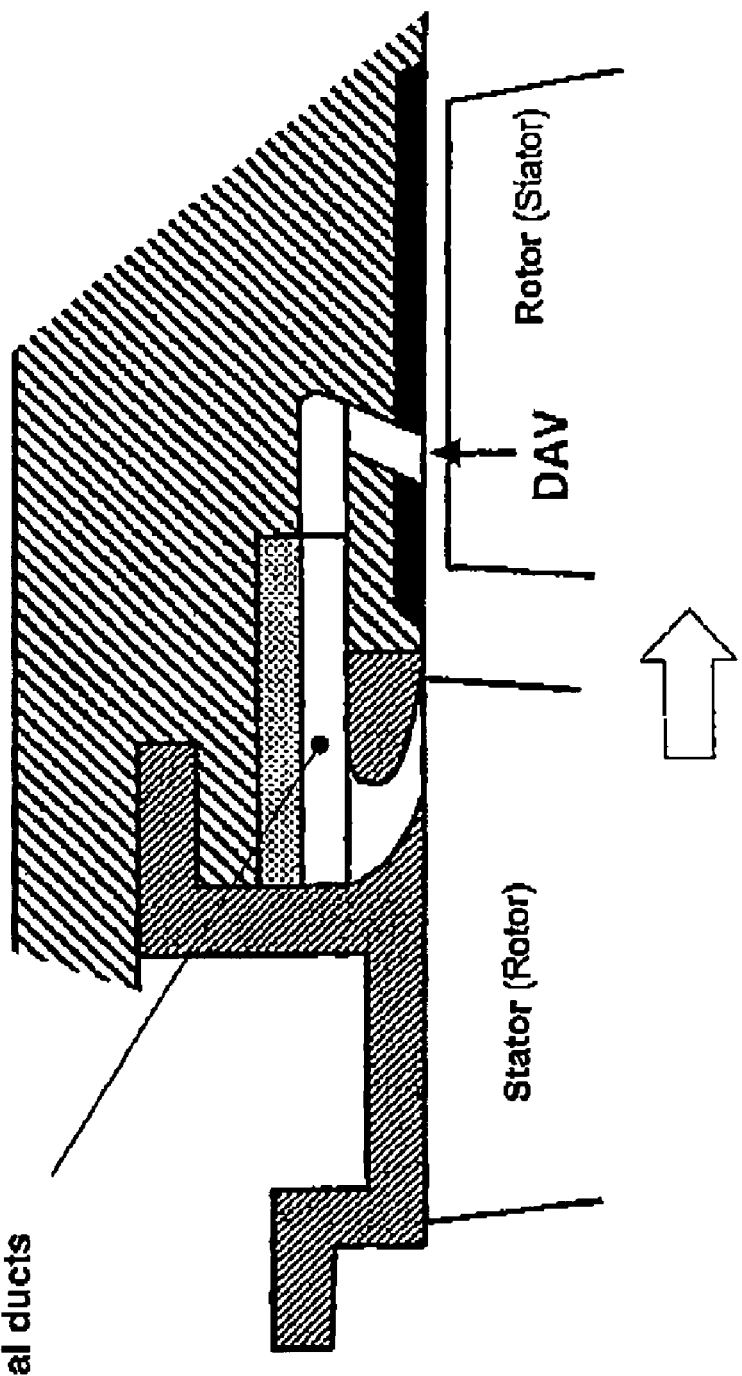

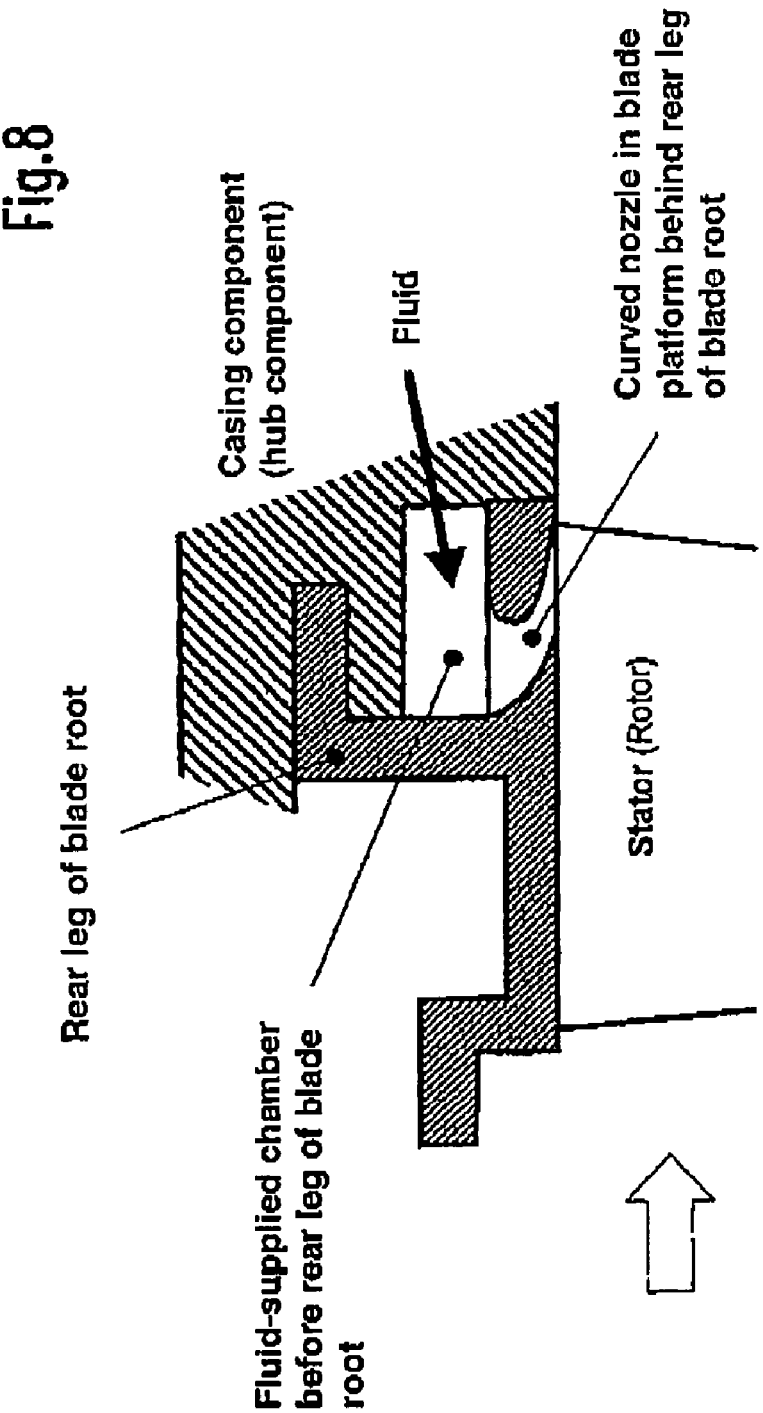

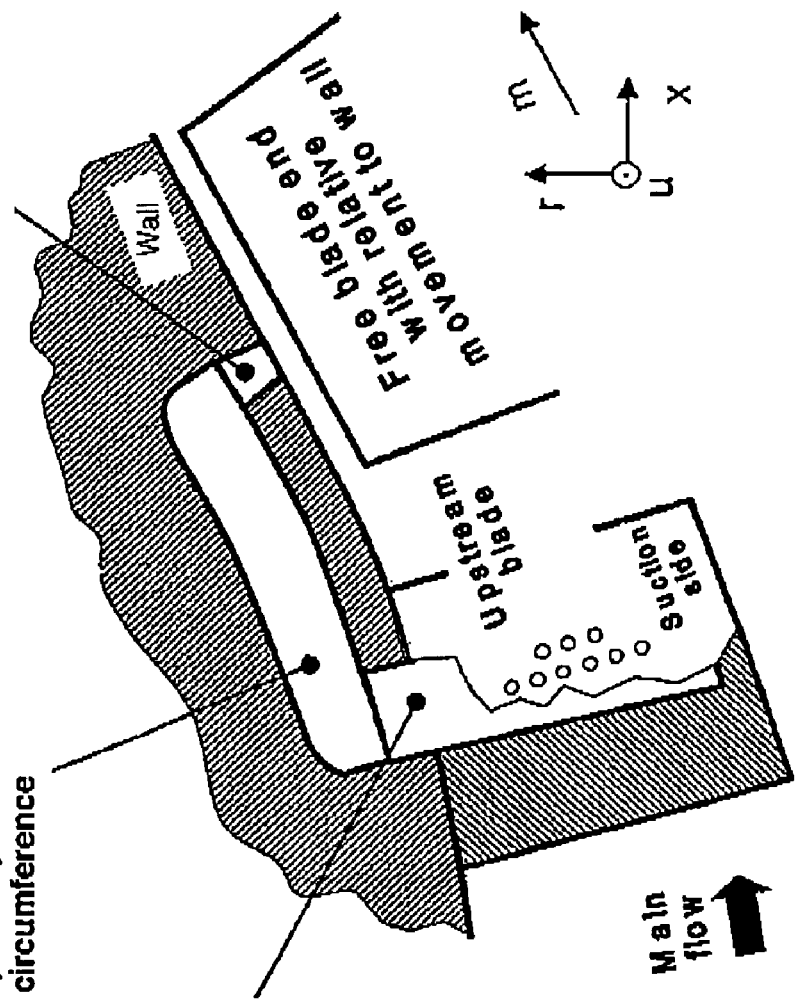

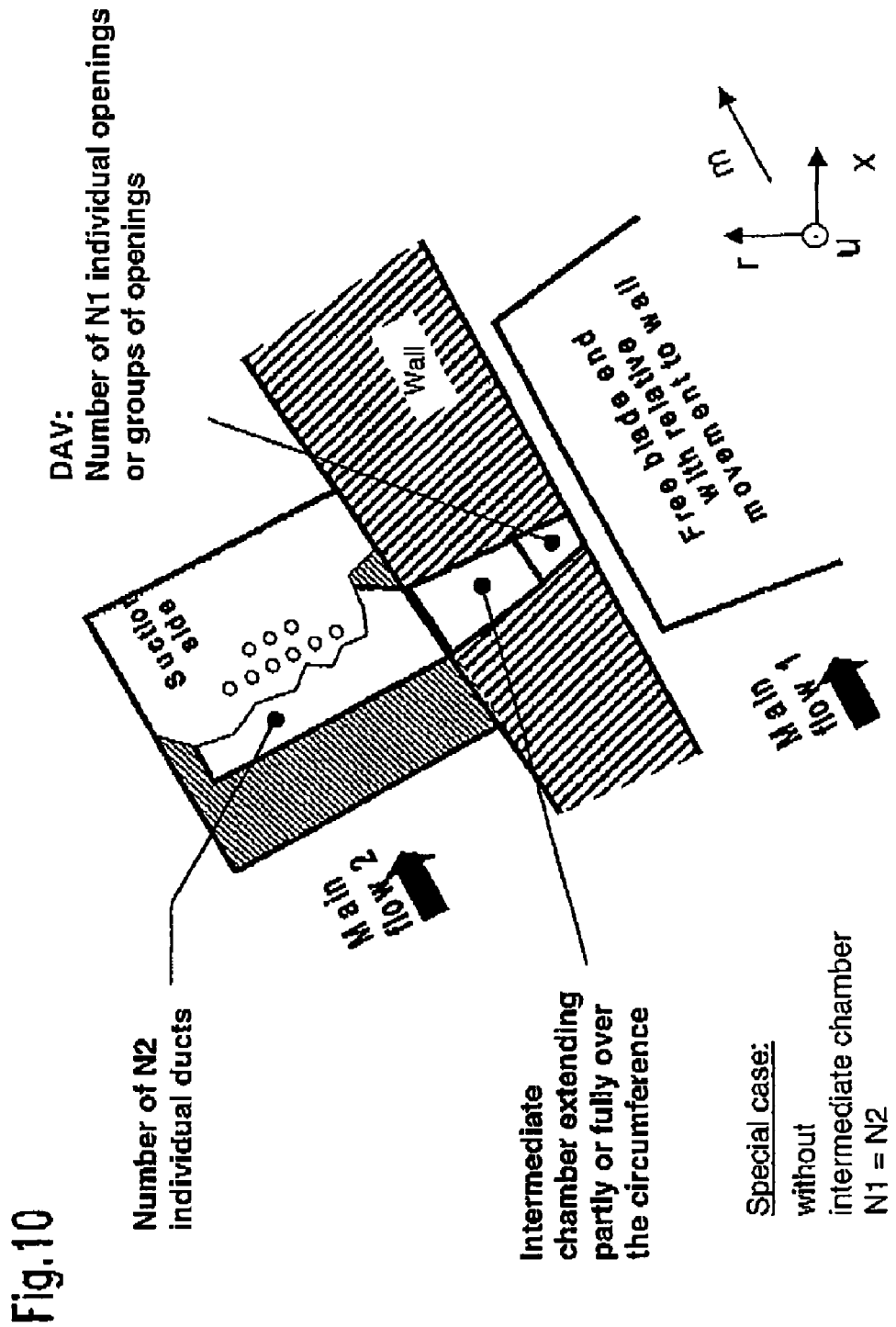

TURBOMACHINE EXERTING DYNAMIC INFLUENCE ON THE FLOW

This application claims priority to German Patent Application DE 10 2004 055 439.0 filed Nov. 17, 2004, the entirety of which is incorporated by reference herein.

BACKGROUND OF THE INVENTION

The present invention relates to turbomachines, such as blowers, compressors, pumps and fans of the axial, semi-axial and radial type. The working medium or fluid may be gaseous or liquid.

The turbomachine according to the present invention may comprise one or several stages of which each usually includes one rotor and one stator; in individual cases the stage is formed by a rotor only.

More particularly, this invention relates to a turbomachine with at least one rotor, with the rotor comprising several rotor blades attached to a rotating shaft. At least one stator can exist, with the statar being provided with stationary stator blades. A casing exists which confines the passage of fluid though the rotor and the stator in the outward direction.

The aerodymamic loadability and the efficiency of turbomachines, such as blowers, compressors, pumps and fans, is limited by the growth and the separation of boundary layer on the blades as well as on the hub and casing walls. The state of the art proposes continuous boundary layer removal or continuous fluid supply for energization of the boundary layers as a measure against this fundamental problem. while the existing concepts can be quite effective with regard to the influence on the boundary layers obtained, the necessary secondary fluid mass flows are so large that the efficiency of the overall system in which they are applied can possibly be affected.

With regard to fluid removal, different methods are proposed which provide for removal of the boundary layer on the blade suction side via slots or holes or also fine-pore surfaces. Normally, the boundary layer is first led inside the blade and then removed from the respective blade and the main flow path of the turbomachine. Only one solution for a rotor provides for withdrawal of the boundary layer on the blade suction side and direct re-flow at the blade tip of the same blade. In addition, drafts exist which provide for circumferential slots on hub or casing before or behind a blade row to withdraw the sidewall boundary layer there. However, even if limited to parts of the operating range of the machine in specific cases, the influence on the boundary layers by fluid removal is always a continuous one.

The state of the art with regard to influencing boundary layers by fluid removal, in its substance, is summarized in the following documents:

1.) Withdrawal on the blade surface via holes, individual slots or porous zones

U.S. Pat. No. 2,720,356
U.S. Pat. No. 3,694,102
U.S. Pat. No. 3,993,414
U.S. Pat. No. 5,904,470
U.S. Pat. No. 5,480,284

2.) Withdrawal on hub or casing via circumferential slots before/behind the blade row Schuler et al.: Design, Analysis, Fabrication and Test of an Aspirated Fan Stage, ASME Paper 2000-GT-618, and
Merchant et al.: Aerodynamic Design and Analysis of a High Pressure Ratio Aspirated Compressor Stage, ASME Paper 2000-GT-619.

With regard to fluid supply, various concepts for turbine blades exist, but these are not applicable to turbomachines since they essentially serve for surface cooling, not for boundary layer energization. From compressor cascade experiments, concepts are known in which air is blown out from a pressurized chamber in the blade interior to the blade suction side to energize the two-dimensional profile boundary layer. Related alternative proposals provide for direct passage of the fluid from the blade pressure side to the blade suction side. In addition, a concept exists for rotors which provides for the supply of air at hub and casing via axially symmetric slots to influence the wall boundary layers there. Finally, publications of research organizations exist showing concepts in which rotors are blown from individual nozzles in the vicinity of the casing to favorably influence the radial gap flow there. However, even if limited to parts of the operating range of the machine in specific cases, the influence on the boundary layers by fluid supply is always a continuous one.

The state of the art with regard to influencing boundary layers by fluid supply, in its substance, is summarized in the following documents:

U.S. Pat. No. 5,690,473
U.S. Pat. No. 6,334,753
U.S. Pat. No. 2,870,957
U.S. Pat. No. 2,933,238
U.S. Pat. No. 5,480,284

Finally, concepts exist which provide for recirculation by way of fluid removal and fluid supply:

U.S. Pat. No. 2,749,027

While the existing solutions may well be capable of exerting a positive influence on the flow, the disadvantage of the state of the art lies in the fact that the secondary fluid mass flows required must be so large that the efficiency of the entire installation, which may be established by the turbomachine with its secondary fluid system or also by a gas turbine, a jet engine, power station or another higher-level system, can possibly be impaired. Existing concepts employ neither the sources existing within the turbomachine nor those additionally provided outside of the turbomachine to effect pulsation or alternation of the secondary fluid flow, which would permit the boundary layers on the blade and wall surfaces of the main flow path of the turbomachine to be influenced with significantly smaller auxiliary mass flows.

BRIEF SUMMARY OF THE INVENTION

A broad aspect of the present invention is to provide a turbomachine of the type specified above which, while avoiding the disadvantages of the state of the art, is characterized by exerting a highly effective influence on the boundary layer due to a dynamic secondary fluid flow, i.e. pulsating fluid removal or supply or temporally alternating fluid removal and supply, respectively.

It is a particular object of the present invention to provide a solution to the above problems by a combination of the characteristics described below. Further advantageous embodiments of the present invention will become apparent from the description herein.

According to the present invention, the rotor includes a number of blades which are connected to the rotating shaft of the turbomachine and impart energy to the working medium. A stator includes a number of stationary blades which, on the casing side or on the hub side, can have a fixed or free blade end. At least one rotor or stator of the turbomachine has a free blade end with adjacent air gap.

The turbomachine may be provided with a stator upstream of the first rotor, a so-called inlet guide vane assembly. In addition, at least one stator or inlet guide vane assembly, instead of being fixed, can be variable to change the angle of attack. A spindle accessible from the outside of the annulus can, for example, accomplish such a variation.

The turbomachine may, in a special form, be provided with at least one row of variable rotors.

In an alternative configuration of the turbomachine, multistage types of said turbomachine may have two counter-rotating shafts, with the direction of rotation of the rotor blade rows alternating between stages. Here, no stators exist between subsequent rotors. The turbomachine may also have a bypass configuration, with the single-flow annulus dividing into two concentric annuli behind a certain blade row, with each of these annuli housing at least one further blade row.

More particularly, the present invention provides for a turbomachine which features means for temporal variation and, if applicable, directional alternation of fluid movement between running-gap adjacent hub and casing surfaces (LNGO) and blade-passage confining surfaces (SKO), with openings or groups of openings being circumferentially distributed on the running-gap adjacent surfaces (LNGO) of at least one blade row whose centroids are spaced from each other by the unity or multiple of the blade pitch at the free end of the respective blade row, thus forming a dynamically operating supply point (DAV). It is further provided that the openings on running-gap adjacent surfaces (LNGO) are connected via at least one chamber and/or line outside of the main flow path to further openings on blade-passage confining surfaces (SKO) of the same blade row and/or openings on blade-passage confining surfaces (SKO) of at least one blade of at least another, adjacent blade row.

Summarizing, then, fluid is removed from the flow path in the area of the running-gap adjacent hub and casing surface (LNGO). The fluid is removed at a dynamically operating supply point (DAV). The fluid is transported via a line and, if applicable, a chamber incorporated in the line either against the main flow direction or in the main flow direction. The fluid is discharged at blade-passage confining surfaces (SKO) either through the casing wall or via a surface of a rotor or a stator, respectively. According to the present invention, the oscillating movement of the fluid in the line also enables the fluid in the line to be alternatingly moved in the opposite direction, so that both openings, SKO and DAV, described in the above are employed for both introduction and discharge of fluid.

BRIEF DESCRIPTION OF THE DRAWINGS

The present invention is more fully described in the light of the accompanying drawings showing preferred embodiments. In the drawings, FIG. 5 is a representation regarding the definition of the term LNGO in accordance with the present invention, FIG. 6a is a representation regarding the definition of the dynamically operating supply point (DAV), FIG. 6b is a representation of variants of the dynamically operating supply point (DAV), FIG. 7a shows a solution in accordance with the present invention with connection between supply point (DAV) and a location in the main flow path before the same blade row (basic concept A), FIG. 7b shows a solution in accordance with the present invention with connection between supply point (DAV) and a location in the main flow path before the same blade row (basic concept A), execution with curved nozzles, FIG. 7c shows a solution in accordance with the present invention with connection between supply point (DAV) and a location in the main flow path before the same blade row (basic concept A), execution with curved nozzles and separators, FIG. 7d shows a solution in accordance with the present invention with connection between supply point (DAV) and a location in the main flow path before the same blade row (basic concept A), execution with interrupted or no abradable coating, respectively, FIG. 7e shows a solution in accordance with the present invention with connection between supply point (DAV) and a location in the main flow path before the same blade row (basic concept A), execution with separation of components in the area of the curved nozzles, FIG. 7f shows a solution in accordance with the present invention with connection between supply point (DAV) and a location in the main flow path before the same blade row (basic concept A), execution with separation of components in the area of the curved nozzles and separator insert, FIG. 7g shows a solution in accordance with the present invention with connection between supply point (DAV) and a location in the main flow path before the same blade row (basic concept A), execution with curved nozzles in the upstream blade row, FIG. 8 shows a solution in accordance with the present invention for embedding a curved nozzle in a blade component with circumferential roots, FIG. 9 shows a solution in accordance with the present invention with connection between supply point (DAV) and the blade-passage confining surfaces (SKO) of an upstream stator blade row (basic concept B), and FIG. 10 shows a solution in accordance with the present invention with connection between supply point (DAV) and the blade-passage confining surfaces (SKO) of a blade row arranged in the adjacent main flow path (basic concept C).

DETAILED DESCRIPTION OF THE INVENTION

Figure 1:
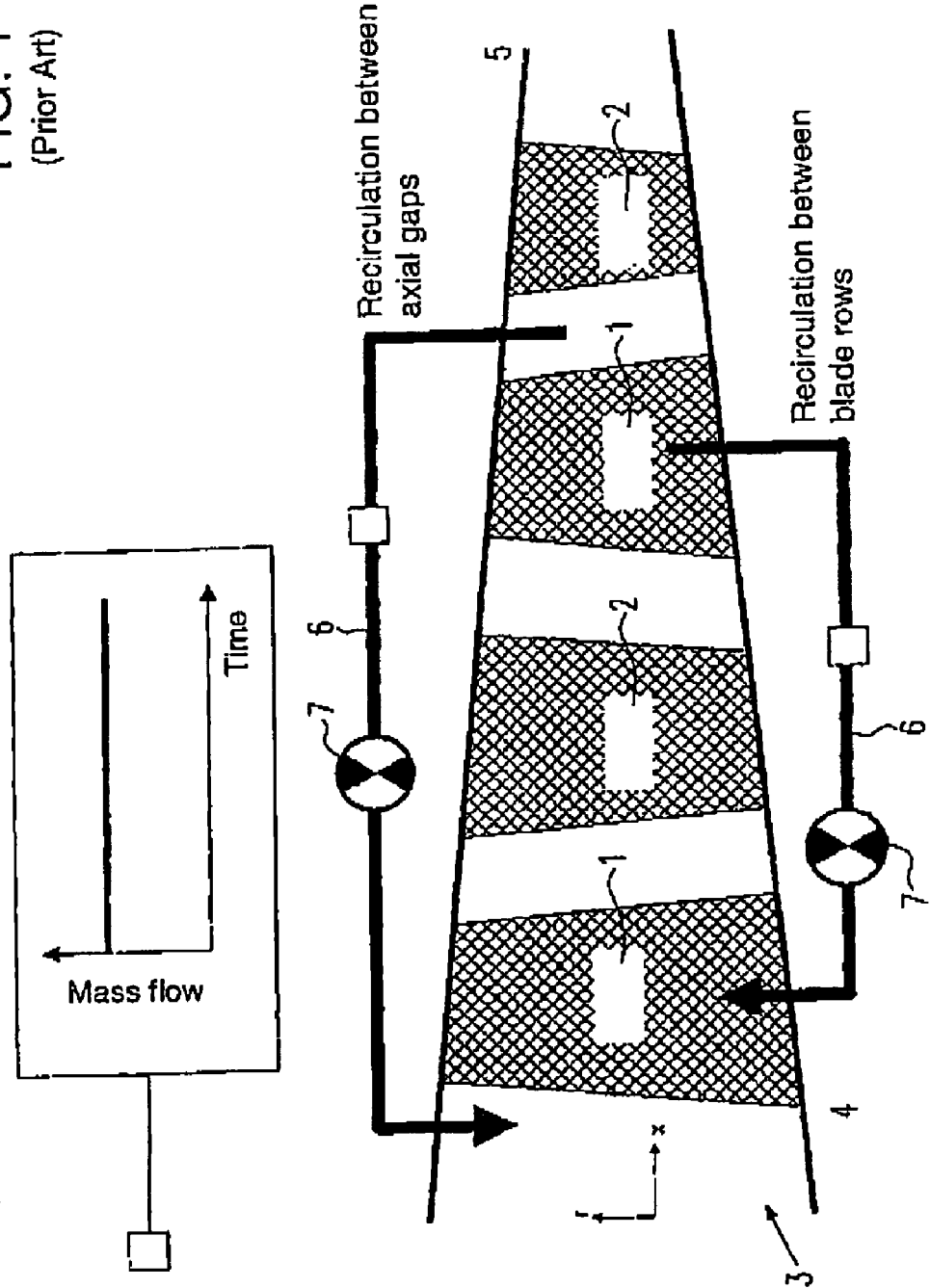
FIG. 1 is a schematic representation of the state of the art.

FIG. 1 shows, in highly simplified representation, solutions according to the state of the art. Shown is a turbomachine with a number of blade rows, rotors 1 and stators 2, within the main flow path which is confined by the annulus 3, usually a hub 4 (rotor drum) and a casing 5. Existing fluid circulation systems 6 (possibly with throttling element 7) exert an influence on the flow by means of secondary fluid flows which remain temporally unchanged at a fixed operating point of the turbomachine. This is shown by a small rectangular symbol in the secondary flow paths and graphically represented in the upper portion of the figure. In known solutions, the openings for the exchange of the secondary fluid are either arranged at locations which are subject to constant pressure at a given operating point or designed such that pressure variations, which occur, for example, at the radial running gap of a shroudless rotor at a certain, non-rotating location of the casing 5 or at the radial running gap of a shroudless stator at a certain, rotating location of the hub 4, are not employed for a temporally variable transfer of secondary fluid. Consequently, the secondary fluid mass flows used are unfavorably large, temporally constant and directionally fixed.

Figure 2:
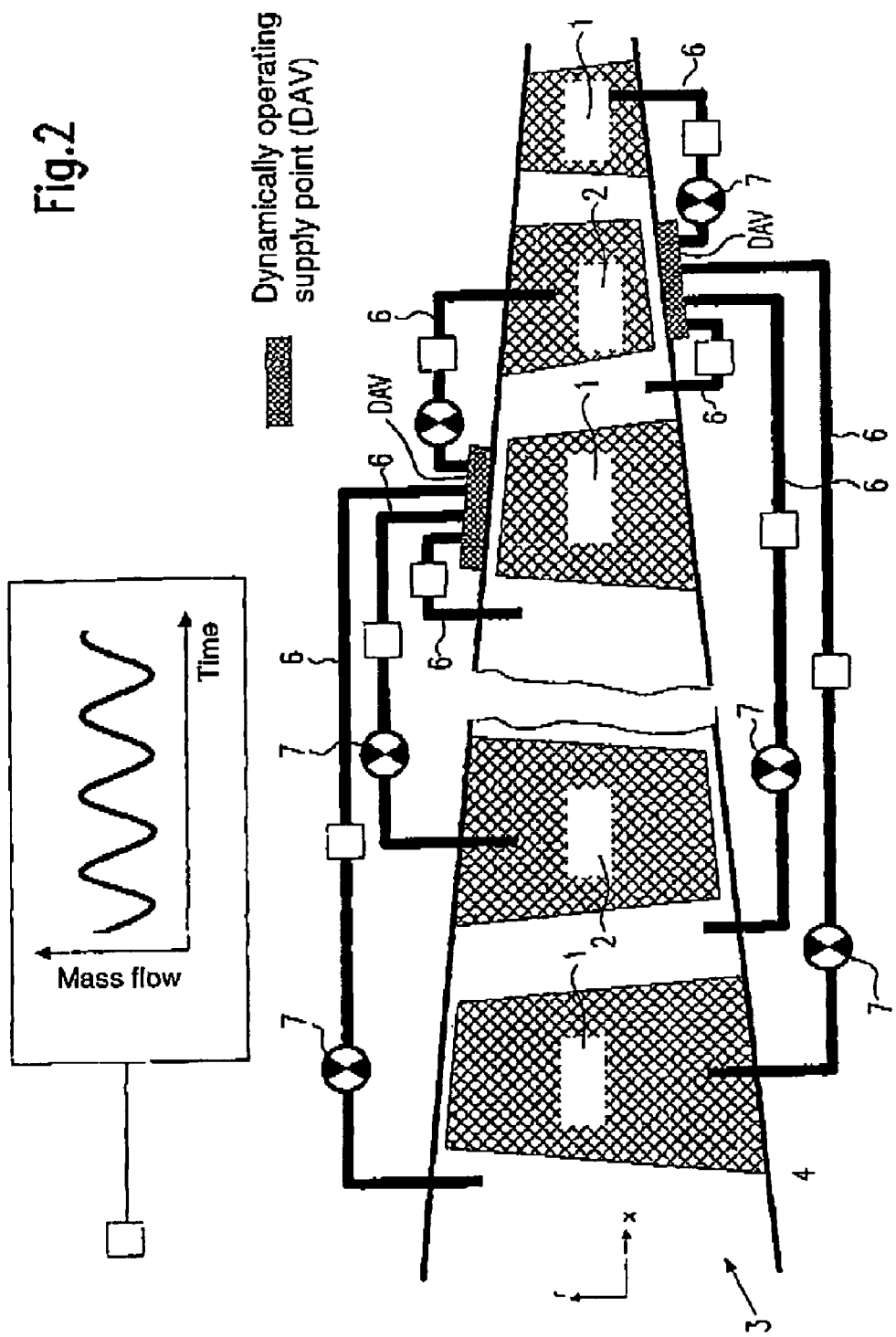
FIG. 2 is a schematic representation of variants of the basic concept in accordance with the present invention.

FIG. 2 shows in highly simplified representation the turbomachine in accordance with the present invention, with a number of blade rows (rotors 1 and stators 2) within the main flow path 3 (annulus), which is confined by the annulus 4, usually a hub (rotor drum) and a casing 5. According to the present invention, a supply point for a pressure which considerably changes temporally with the blade passage frequency of the respective blade row is provided by specifically arranged openings on the running-gap adjacent hub and casing surfaces (LNGO). This dynamically operating supply point (DAV), which is always provided on the radial gap of free blade ends, is connected by a line system to openings on blade-passage confining surfaces (SKO) of one or more blade rows of a turbomachine, if applicable via a fixed or regulated throttling element.

Consequently, the resultant secondary fluid mass flows are small, temporally varying and, if applicable, directionally alternating. This is shown by a small rectangular symbol in the secondary flow paths and graphically represented in the upper portion of the figure.

In the upper half of the figure, several solutions according to the present invention provided on the periphery of the casing are exemplified. The supply point (DAV) located above the outside radial running gap of a rotor blade row of the turbomachine can be connected to at least one of the following locations of the main flow path of the turbomachine:

1.) Openings on casing surfaces (by definition belonging to the blade-passage confining surfaces—SKO) before the same rotor blade row,
2.) Openings on blade-passage confining surfaces (SKO) of another upstream rotor or stator blade row,
3.) Openings on blade-passage confining surfaces (SKO) of another downstream rotor or stator blade row, Not graphically represented, but nonetheless in accordance with the present invention, is a connection of the rotor supply point (DAV) with:

4.) Openings on blade-passage confining surfaces (SKO) of a rotor or stator blade row situated in an adjacent main flow path (bypass flow configuration).

In the lower half of the figure, several solutions according to the present invention provided in the area of the hub are exemplified. The supply point (DAV) situated beneath the inside radial running gap of a stator blade row of a turbomachine can be connected to at least one of the following locations of the main flow path of the turbomachine:

1.) Openings on hub surfaces (by definition belonging to the blade-passage confining surfaces—SKO) before the same stator blade row,
2.) Openings on blade-passage confining surfaces (SKO) of another upstream rotor or stator blade row,
3.) Openings on blade-passage confining surfaces (SKO) of another downstream rotor or stator blade row.

Not graphically represented, but nonetheless in accordance with the present invention, is a connection of the stator supply point (DAV) with:

4.) Openings on blade-passage confining surfaces (SKO) of a rotor or stator blade row situated in an adjacent main flow path (bypass flow configuration).

Figure 3:
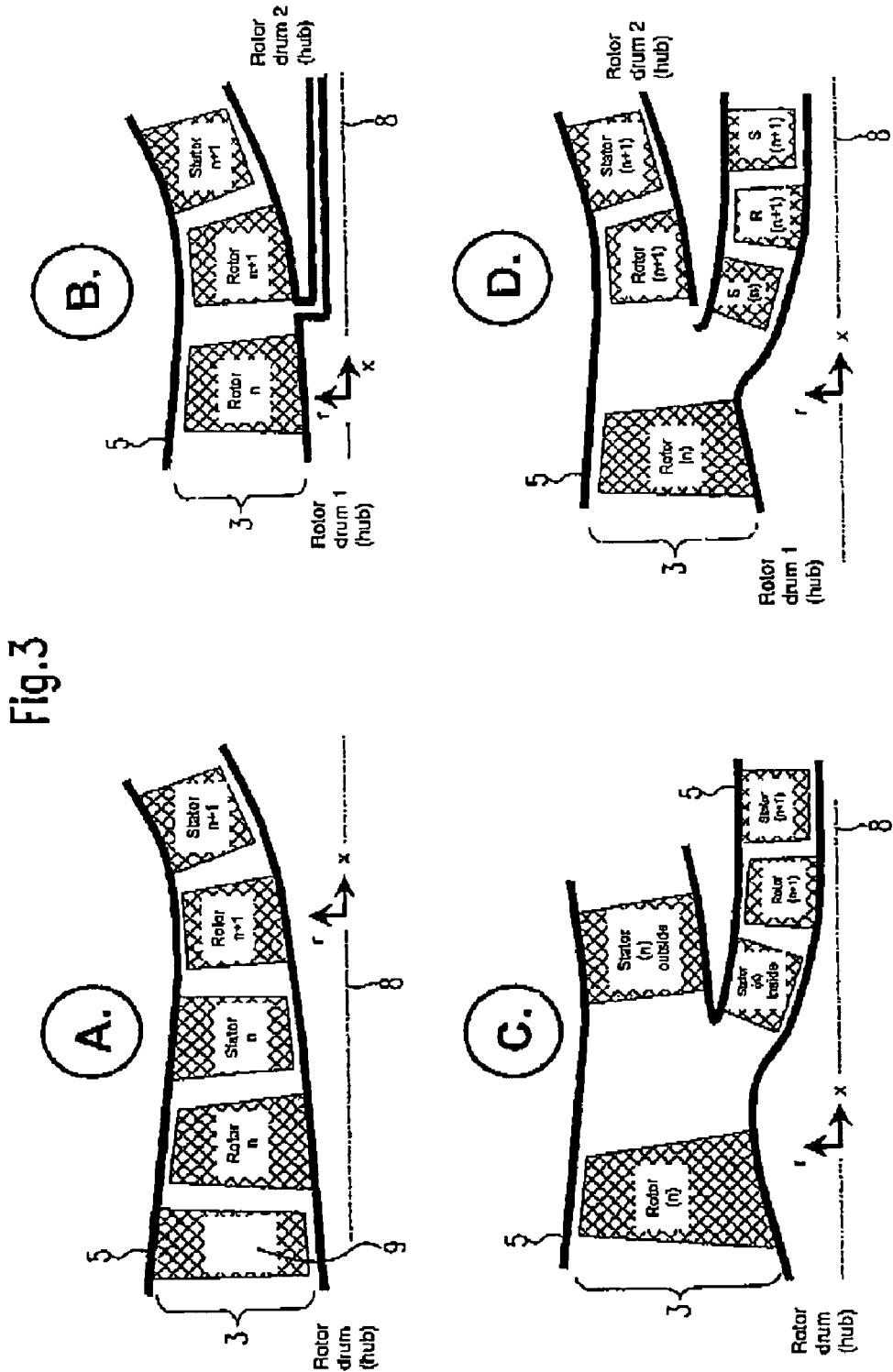
FIG. 3 shows different variants and configurations of the turbomachine in accordance with the present invention.

To clarify the scope of application of the present invention, FIG. 3 shows four possible configurations of the main flow path of the turbomachine with dynamic self-influencing according to the present invention. In each case, an annulus flown from the left to the right is shown. A rotor drum rotates around the machine axis identified. In the examples in FIGS. 3B and 3D, a further rotor drum (hub) is provided. The rotors 1, the stators 2 and the inlet guide vane assembly 9 are each identified, with a blade being schematically shown in each case.

Figure 4:
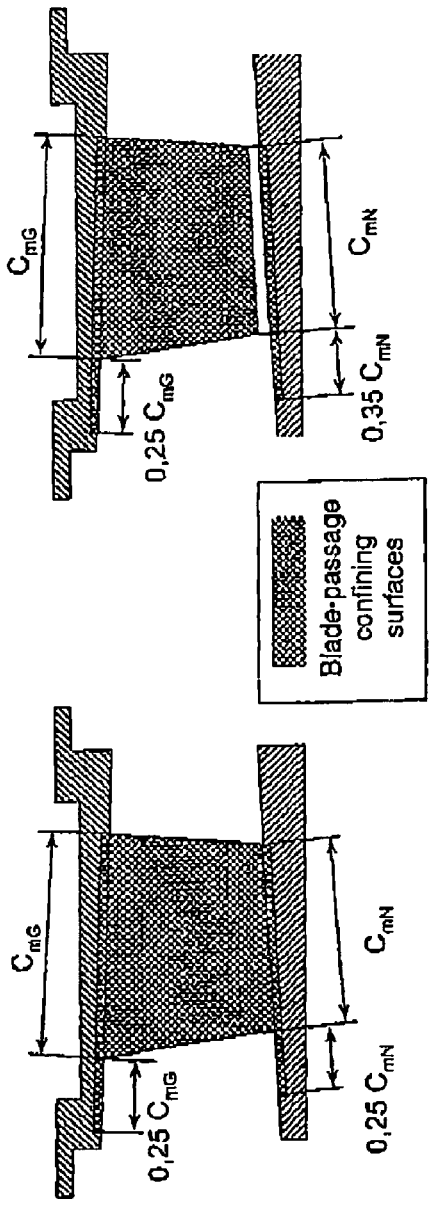
FIG. 4 is a representation regarding the definition of the term SKO in accordance with the present invention.

FIG. 4 shows the definitions of the term "blade-passage confining surfaces" SKO as used in the context of the present invention. The individual areas are here differently arranged and dimensioned, as becomes apparent from the inscriptions in FIG. 4. Again in simplified representation, a blade row is shown which is arranged within the main flow path (annulus 3) between a casing 5 and a hub 4 (rotor drum). Blade-passage confining surfaces in the context of the present invention are, as shown in FIG. 4, a) all surfaces of a blade itself (suction side, pressure side, leading edge and trailing edge), b) surfaces on hub 4 and casing 5 of the turbomachine located between the leading and trailing edge of the blade row under consideration, c) surfaces on hub or casing with firm attachment to the blade (blade platforms, shrouds, blisk or bling configurations) between a location situated 25 percent of the local meridional blade chord length (CmG or CmN, respectively) before the leading edge and the leading edge itself, and d) surfaces on hub or casing without firm attachment to the blade (free rotor or stator ends) between a location situated 35 percent of the local meridional blade chord length (CmG or CmN, respectively) before the leading edge and the leading edge itself.

FIG. 5 shows the definitions of the term "running-gap adjacent hub and casing surfaces" LNGO as used in the context of the present invention. Again in simplified representation, a blade row is shown which is arranged within the main flow path (annulus) between a casing 5 and a hub 4 (rotor drum). Running-gap adjacent hub and casing surfaces in the context of the present invention are, as shown in FIG. 5, all surfaces of the inner and outer confines of the main flow path (annulus) of the turbomachine which border on the radial gap of a rotor or stator row, respectively, in the area of the meridional chord length (CmG or CmN, respectively) available between the leading and trailing edge position and which are characterized by a relative movement between them and the blades of the respective blade row.

FIG. 6a shows the dynamically operating supply point DAV which is the basis of all solutions according to the present invention. By definition, it is provided at the running-gap adjacent surfaces of hub 4 or casing 5. On the left-hand side of the figure, a corresponding configuration is shown in the plane defined by the radial direction r and the axial direction x. The running gap is between the blade tips of the respective blade row and the respective wall. A relative movement exists between the blade tips and the wall. In the area between leading and trailing edge of the blade row, an arrangement of openings or groups of openings is provided in the running-gap adjacent wall of the main flow path, which openings are distributed in the circumferential direction of the machine and whose positions are defined by their respective centroids F. In the meridional direction m, the centroids of the individual openings or groups of openings, respectively, have a distance "a" from the leading edge which can be between 0 and 100 percent of the meridional blade tip chord length Cm ($0<a<Cm$). For particularly favorable arrangements according to the present invention, the following applies: $0.05*Cm<a<0.40*Cm$.

The openings or groups of openings provide the connection to an arrangement of flow paths separate from the main flow path and extending partly or entirely over the circumference and making a connection to the blade-passage confining surfaces SKO of upstream or downstream blade rows. In the right-hand half of the figure, view G-G is shown which is a circumferential development of the arrangement of individual openings according to the present invention. Particularly favorable is an arrangement of the opening centroids F at an equal distance "a" from the alignment of leading edges and with distances K of the individual centroids of exactly one blade spacing S or an integer (whole) multiple of S (K=n*S; n=1,2,3, ..., N). N is the number of blades. Accordingly, the minimum possible distance K according to the present invention is one blade spacing S (N openings or groups of openings, respectively). The maximum possible distance according to the present invention is one full circumferential length resulting from the number of blades N and the blade spacing S (1 opening or group of openings, respectively). If required, "a" and K may vary within +/−0.25 Cm in a given supply point (DAV) arrangement without impairing the basic functionality of the supply point (DAV).

FIG. 6b shows alternative arrangements according to the present invention in which an individual opening is replaced by a group of openings, characterized in that each group is clearly identifiable as such by the amount of the spacings, has a group-specific centroid F and can be positioned within a blade passage without overlap with suction or pressure side of two adjacent blades. The shape of the openings belonging to the group is here irrelevant and, therefore, optional. According to the present invention, specifically shaped holes or slots are possible.

FIG. 7a shows an inventive solution with connection between supply point (DAV) and a location in the main flow path before the same blade row (basic concept A). Here, a number of N1 openings or groups of openings, respectively, makes a connection to an intermediate chamber which is located outside of the main flow path and can extend fully or partly over the circumference, A number of N2 ducts (N2<=N1) makes the connection between the intermediate chamber and a wall area on the main flow path before the blade row. According to the present invention, a circumferentially completely closed wall area always exists, when viewed in the meridional direction, between the location of these further openings and the location of the supply point (DAV). If the number N1 is small, it can be favorable according to the present invention to design the configuration without an intermediate chamber, in which case N1=N2.

FIG. 7b shows a particularly simple design of the basic concept A. The openings of the supply point (DAV) are here provided as individual bore holes whose axis can be inclined both in the meridional direction and in the circumferential direction. In this example, an intermediate chamber is provided which extends along the entire circumference. Upstream of the supply point (DAV), the intermediate chamber lies next to openings which are also situated on the main flow path and, in a particularly advantageous embodiment according to the present invention, have the form of a nozzle curved in downstream direction. The curved nozzle is characterized in that the normal on its throat area includes an acute angle with the meridional direction. FIG. 7c shows the same configuration, however with additional separators being provided to create individual ducts of which each leads to a nozzle. The contour of the connecting ducts (or the contour of the separators, respectively) is here shown round, but a simpler, In the extreme case straight form with pointed separator leading edge is also possible according to the present invention. It is also particularly advantageous to provide for an integer ratio of N1/N2 (N1/N2−2, 3, 4 . . . ). Furthermore, it is particularly favorable if the supply point (DAV) openings and the nozzle openings are circumferentially offset relative to each other by a certain amount.

According to the present invention, the cross-section of the intermediate chamber and of the connecting ducts in the meridional plane, different to the simple rectangular shape selected here, may additionally be rounded, and the confining walls need not be arranged in parallel with or vertical to the main flow path.

According to the present invention, the openings of the supply point (DAV) may also lead through the abradable coating applied to the wall component on the hub or casing, as shown in FIG. 7b, c, or be provided in a protrusion of the wall component embedded in the abradable coating which is flush with the surface of the abradable coating or is radially reset relative to the abradable coating, as shown in FIG. 7d. The wall material protrusion is provided at discrete locations or on the entire circumference. Finally, the openings of the supply point (DAV) may also be provided in a wall with no abradable coating applied.

FIG. 7e further shows a design solution for the basic concept A according to the present invention which includes components of the upstream blade row. This can be an assembly of casing and stator parts (running gap on rotor) or, alternatively, an assembly of hub and rotor parts (running gap on stator 2). The openings upstream of the supply point (DAV), here again shown as curved nozzles, are formed by both casing and stator parts (or hub and rotor parts, respectively). The border between the respective parts is at any point of the nozzle contour. FIG. 7f shows a related configuration, but with an additional, ideally semi-annual or annual insert which overlaps with the nozzle area and in which individual ducts which are well tuned to the number and shape of the nozzles are provided (separators).

FIG. 7g further shows a design solution for the basic concept A according to the present invention which includes components of the upstream blade row. In this variant, the openings upstream of the supply point (DAV), here again shown as curved nozzles, are arranged fully in components of the upstream blade row and located at least partly within a passage between two blades. According to the present invention, this variant can also be provided with a separator insert (as shown in FIG. 7g) or, in simpler form, without separator insert.

FIG. 8 highlights the concept of a blade component with circumferential roots and at least one curved nozzle at least partly arranged within the bladed space (blade passage). According to the present invention, this concept is characterized by the arrangement of the nozzle downstream of the rear leg of the blade root.

FIG. 9 shows a solution according to the present invention with connection between the supply point (DAV) and the blade-passage confining surfaces (SKO) of an upstream blade row (basic concept B). Here, the blade suction side is selected as an example for a blade-passage confining surface (SKO). Also shown is a configuration of holes as an example for openings. According to the present invention, any other opening position and configuration at other blade-passage confining surfaces (SKO) of the blade may be provided. In accordance with the present invention, a number of N1 openings or groups of openings, respectively of the supply point (DAV) makes a connection to an intermediate chamber which is located outside of the main flow path and can extend fully or partly over the circumference. A number of N2>=N1 ducts makes the connection between the intermediate chamber and the blade interior of the upstream blade row. At least one blade of the row is made accessible by one duct each. In the special case that the numbers of individual ducts and supply point (DAV) openings agree (N1=N2), the arrangement may, according to the present invention, be designed without an intermediate chamber.

FIG. 10 shows a solution according to the present invention with connection between the supply point (DAV) and a blade row arranged in the adjacent main flow path (basic concept C). Here, the blade suction side is selected as an example for a blade-passage confining surface (SKO). Also shown is a configuration of holes as an example for openings. According to the present invention, any other opening position and configuration at other blade-passage confining surfaces (SKO) of the blade may be provided. In accordance with the present invention, a number of N1 openings or groups of openings, respectively of the supply point (DAV) makes a connection to an intermediate chamber which is located outside of the main flow paths 1 and 2 and can extend fully or partly over the circumference. A number of N2>=N1 ducts makes the connection between the intermediate chamber and the blade interior of the upstream blade row. At least one blade of the row in the main flow path 2 is made accessible by one duct each. In the special case that the numbers of individual ducts and supply point (DAV) openings agree (N1=N2), the arrangement may, according to the present invention, be designed without intermediate chamber.

The turbomachine in accordance with the present invention accordingly provides a yet unequalled degree of boundary layer influencing. This is achievable with various types of turbomachines, such as blowers, compressors, pumps and fans. Depending on the design variant, aerodynamic loadings and flow deflections are possible which exceed the state-of-the-art values by up to 50 percent. For declared performance values of a turbomachine, the number of components installed can be reduced by approx. 30 percent as compared to a conventional design, with improvement of efficiency of up to 3 percent. Costs are reduced by 10 to 15 percent. If the new blade concept is used in the compressor of an aircraft engine with approx. 25,000-pound thrust, the specific fuel consumption is reduced by up to 1 percent and the weight by approx. 15 percent.

LIST OF REFERENCE NUMERALS

1 Rotor
2 Stator
3 Annulus
4 Hub
5 Casing
6 Line (secondary fluid flow)
7 Throttling element
8 Machine axis
9 Inlet guide vane assembly
10 Wall

What is claimed is:

1. A turbomachine comprising:
at least one rotor;
at least one stator;
a hub;
a casing, the hub and casing confining a flow through the rotor and the stator to the inside and to the outside;
running-gap adjacent surfaces on at least one of the hub and the casing directly opposite and facing a free end of a blade row, a plurality of separate independent openings positioned on and along a blade row free end facing circumference of at least one of the running-gap adjacent hub and casing surfaces which form a plurality of dynamically operating supply points, each of the separate independent openings directly facing, and opening independently of one another to, the free end of the blade row, with centroids of the separate independent openings being spaced from each other by an integer multiple of a blade spacing at the free end of a respective blade row, and all of the separate independent openings being arranged such that they have a dynamic pressure synchronous with one another and a blade passing frequency; the separate independent openings each having a circumferential length of significantly less than one half of one rotor blade pitch;
at least one opening on a blade-passage confining surface; and
at least one line connecting the dynamically operating supply points to the at least one opening on the blade-passage confining surface.

2. The turbomachine of claim 1, wherein at least one of the separate openings of the dynamically operating supply point is provided as a localized group of openings, with the localized group separated from an adjacent separate opening by a distance greater than a spacing between any openings within the localized group.

3. The turbomachine of claim 2, wherein the openings on the running-gap adjacent hub and casing surfaces are connected via at least one of a chamber and a second line situated outside a main flow path to further openings on blade-passage confining surfaces of the same blade row.

4. The turbomachine of claim 3, wherein the openings on the running-gap adjacent hub and casing surfaces are connected via at least one of a chamber and a third line situated outside a main flow path to further openings on blade-passage confining surfaces of at least one blade of at least another adjacent blade row.

5. The turbomachine of claim 3, wherein the openings on the running-gap adjacent hub and casing surfaces are connected to at least one curved nozzle located at least partly within a bladed space, with the nozzle being arranged downstream of a rear leg of a blade root of at least another adjacent blade row.

6. The turbomachine of claim 5, wherein a throttling element is arranged in the line.

7. The turbomachine of claim 6, wherein the throttling element is fixed.

8. The turbomachine of claim 6, wherein the throttling element is regulated.

9. The turbomachine of claim 1, wherein the openings on the running-gap adjacent hub and casing surfaces are connected via at least one of a chamber and a second line situated outside a main flow path to further openings on blade-passage confining surfaces of the same blade row.

10. The turbomachine of claim 9, wherein the further openings on blade-passage confining surfaces are arranged in a blade component with circumferential roots and defined by at least one curved nozzle located at least partly within a bladed space, with the nozzle being arranged downstream of a rear leg of a blade root.

11. The turbomachine of claim 1, wherein the openings on the running-gap adjacent hub and casing surfaces are connected via at least one of a chamber and a second line situated outside a main flow path to further openings on blade-passage confining surfaces of at least one blade of at least another adjacent blade row.

12. The turbomachine of claim 11, wherein the openings on the running-gap adjacent hub and casing surfaces are connected to at least one curved nozzle located at least partly within a bladed space, with the nozzle being arranged downstream of a rear leg of a blade root of at least another adjacent blade row.

13. The turbomachine of claim 1, wherein a throttling element is arranged in the line.

14. The turbomachine of claim 13, wherein the throttling element is fixed.

15. The turbomachine of claim 13, wherein the throttling element is regulated.

16. The turbomachine of claim 1, wherein the plurality of separate openings cumulatively occupy a minority of the circumference of the at least one running-gap adjacent hub and casing surfaces.

17. A turbomachine comprising:
   at least one rotor;
   at least one stator;
   a hub;
   a casing, the hub and casing confining a flow through the rotor and the stator to the inside and to the outside;
   running-gap adjacent surfaces at at least one of the hub and the casing,
   a plurality of separate openings positioned along a circumference of at least one of the running-gap adjacent hub and casing surfaces which form a plurality of dynamically operating supply points;
   at least one opening on a blade-passage confining surface; and
   at least one line connecting the at least one dynamically operating supply points to the at least one opening on the blade-passage confining surface;
   wherein at least one of the separate openings of the dynamically operating supply points is provided as a localized group of openings, with the localized group separated from an adjacent separate opening by a distance greater than a spacing between any openings within the localized group.

18. A turbomachine comprising:
   at least one rotor;
   at least one stator;
   a hub;
   a casing, the hub and casing confining a flow through the rotor and the stator to the inside and to the outside;
   running-gap facing surfaces on at least one of the hub and the casing directly opposite and facing a free end of a blade row, the running-gap facing surface being a radially outer wall surface if on the hub and a radially inner wall surface if on the casing, such wall surfaces forming a portion of a main flow path through the turbomachine, a plurality of separate independent openings positioned on and along a blade row free end facing circumference of the at least one of the running-gap adjacent outer wall hub and the running-gap adjacent inner wall casing surfaces, the plurality of separate independent openings, separated from each other by at least one of the running-gap facing outer wall hub and inner wall casing surfaces, forming a plurality of dynamically operating supply points, each of the separate independent openings directly facing, and opening independently of one another to, the free end of the blade row, with centroids of the separate independent openings being spaced from each other by an integer multiple of a blade spacing at the free end of a respective blade row, and all of the separate independent openings being arranged such that they have a dynamic pressure synchronous with one another and a blade passing frequency; the separate independent openings each having a circumferential length of siqnificantly less than one half of one rotor blade pitch;
   at least one opening on a blade-passage confining surface; and
   at least one line connecting the dynamically operating supply points to the at least one opening on the blade-passage confining surface.

* * * * *